United States Patent [19]

Kanstoroom

[11] 4,179,946
[45] Dec. 25, 1979

[54] VARIABLE RATIO DRIVE SYSTEM INCLUDING A COMPACT VARIABLE DIAMETER PULLEY

[76] Inventor: Steven J. Kanstoroom, 10516 Cascade Pl., Silver Spring, Md. 20902

[21] Appl. No.: 861,971

[22] Filed: Dec. 19, 1977

[51] Int. Cl.$^2$ .................. F16H 55/52; F16H 55/56
[52] U.S. Cl. .................. 74/230.17 E; 74/230.17 F
[58] Field of Search ............. 74/230.17 E, 230.17 F, 74/230.17 A, 230.17 B, 230.17 C, 230.17 R

[56] References Cited

U.S. PATENT DOCUMENTS

| | | | |
|---|---|---|---|
| 1,618,644 | 2/1927 | Dickson | 74/230.17 E |
| 2,180,217 | 11/1939 | Thomas | 74/230.17 E |
| 2,253,634 | 8/1941 | Mack | 74/230.17 E |
| 2,310,081 | 2/1943 | Hill | 74/230.17 E |
| 2,851,894 | 9/1958 | Seyfarth | 74/230.17 E |
| 2,909,071 | 10/1959 | Smythe et al. | 74/230.17 E |
| 3,088,327 | 5/1963 | Swigart | 74/230.17 F |
| 3,460,399 | 8/1969 | Payne | 74/230.17 A |
| 3,478,611 | 11/1969 | Venne et al. | 74/230.17 E |
| 3,574,366 | 4/1971 | Thostenson | 74/230.17 E |
| 3,664,206 | 5/1972 | Clauss, Jr. | 74/230.17 E |
| 3,715,930 | 2/1973 | Beliveau et al. | 74/230.17 F |
| 3,975,964 | 8/1976 | Adams | 74/230.17 E |
| 3,981,205 | 9/1976 | Avramidis et al. | 74/239.17 E |
| 4,020,711 | 5/1977 | Woolard | 74/230.17 C |
| 4,028,953 | 6/1977 | Lavallee | 74/230.17 E |
| 4,137,786 | 2/1979 | Fenart | 74/230.17 C |

FOREIGN PATENT DOCUMENTS

| | | | |
|---|---|---|---|
| 26700 | of 1904 | United Kingdom | 74/230.17 R |
| 1487241 | 9/1977 | United Kingdom | 74/230.17 E |

*Primary Examiner*—Samuel Scott
*Assistant Examiner*—William R. Henderson
*Attorney, Agent, or Firm*—Sixbey, Friedman & Leedom

[57] ABSTRACT

A variable diameter, speed responsive pulley of extremely compact, simple design is disclosed for use in combination with a variable diameter, tension operated pulley of substantially identical design to provide a controlled speed, variable ratio accessory drive. The speed responsive pulley is formed by a pair of pulley members mounted for relative axial movement on a rotatable central hub wherein each pulley member includes inner and outer frusto-conical surfaces cooperating with corresponding surfaces on the other pulley member to form belt engaging and centrifugal force receiving surfaces, respectively. In one embodiment the speed responsive pulley includes rigid inertial mass members for creating the centrifugal force necessary for operating the pulley. In another embodiment the centrifugal force is developed by an inertial mass having fluid properties.

8 Claims, 5 Drawing Figures

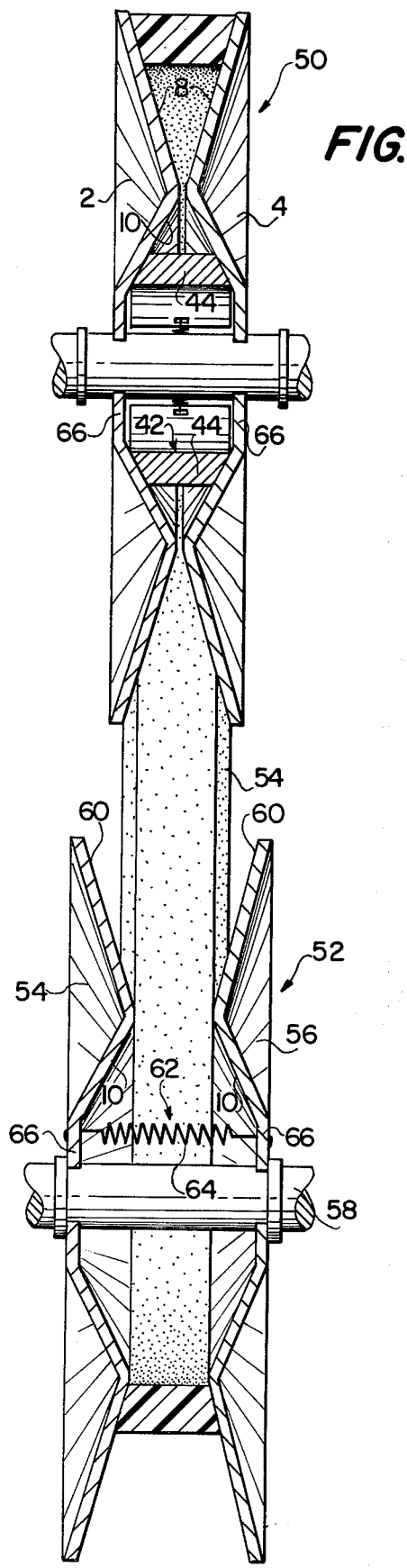
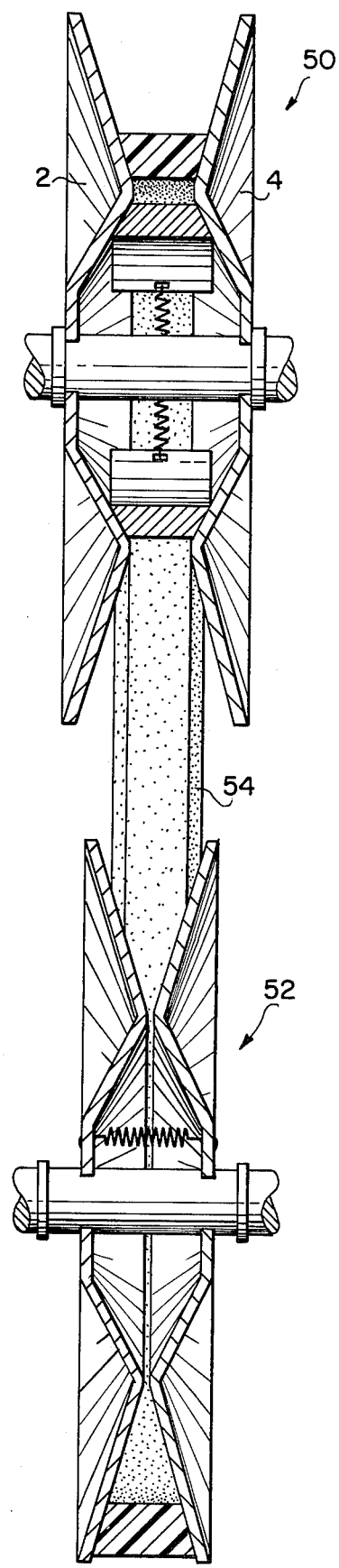
FIG. 3a
FIG. 3b

VARIABLE RATIO DRIVE SYSTEM INCLUDING A COMPACT VARIABLE DIAMETER PULLEY

BACKGROUND OF THE INVENTION (A) Field of the Invention

This invention relates to controlled speed, variable ratio drive systems using centrifugally operated variable diameter pulleys.

(B) Discussion of the Prior Art

Controlled speed accessory drives have been shown to be capable of improving the fuel economy of automobiles, but have not been widely adopted by automobile manufacturers due, among other reasons, to their high cost and lack of reliability. Typical of such prior art drives is the system disclosed in U.S. Pat. No. 3,981,205 wherein the accessories of an automobile are driven by a cooperating pair of variable diameter pulleys one of which is centrifugally operated to cause variation in its effective diameter dependent upon its rotation speed. Devices of this type permit automatic variation in the speed ratio between the engine and the driven accessories and can be designed to drive the accessories at a nearly constant speed approximating the optimum operating speed of the accessories irrespective of the speed at which the engine operates. Thus, even at the high engine speeds encountered during highway usage, only a portion of this engine speed is transmitted to the accessories. The engine power not used to drive the accessories contributes to increased fuel economy. For a more explicit general discussion of this subject, see "Controlled Speed Accessory Drive", copyright 1976 by Morse Chain Division, Borg Warner. Controlled speed drive systems of this type also have application in the drive trains of small motorized vehicles such as motor cycles, mini bikes and motor scooters whereby such systems operate as an automatic transmission having infinitely variable ratio between upper and lower limits, as disclosed, for example, in U.S. Pat. No. 3,747,721.

While known for the purposes noted above, available variable ratio drive systems employing centrifugally operated, variable diameter pulleys suffer design inadequacies which have impaired their widespread use. For example, a variable diameter pulley including a centrifugal operator is normally complicated in design, adds significantly to the space requirements of the pulley mechanism which it is designed to replace and requires frequent cleaning. More particularly, it is a basically recognized principle that the more working parts possessed by a mechanism, the greater will its chances be of experiencing a mechanical failure. The complicated design of known centrifugally operated pulleys generally include an operator mechanism axially positioned to one side of a pair of main pulley members thus requiring a casing or housing separate from the main pulley members. If the added expense of sealing this auxiliary housing is not undertaken, the operating surfaces of the mechanism must be left exposed to the atmosphere, thereby creating the possibility of decreased efficiency or failure due to atmospheric-borne contaminants normally found in and about engines. The inconvenience and/or expense of frequent cleaning necessarily results.

Yet another disadvantage of known variable ratio drive systems employing centrifugally operated variable diameter pulleys is the relatively large amount of space which such systems require. Particularly for small, modern vehicles designed for high fuel efficiency yet equipped with numerous accessories requiring direct engine drive such as a water pump, power steering, air conditioning and an electrical alternator, the problem of system size poses very real problems. Therefore, a controlled speed, variable ratio accessory drive which requires more space within the engine compartment than is occupied by conventional pulley systems is not an attractive system, regardless of its potential for increasing fuel efficiency.

SUMMARY OF THE INVENTION

It is an object of this invention to overcome the deficiencies of the prior art as discussed above, and, in particular, to provide a speed responsive, variable ratio drive including a centrifugally operated variable diameter pulley utilizing a simple, effective design which permits low cost manufacture and efficient operation.

It is another object of the present invention to provide a variable diameter, speed responsive pulley which occupies a minimum amount of space by virtue of its unique configuration whereby the inertial mass members employed are mounted within and conform substantially to the surface design of the pulley members.

It is yet another object of the invention to provide a variable diameter, speed responsive pulley employing unique inertial mass members to confer enhanced flexibility in usage thereupon.

It is still another object of this invention to provide a speed responsive, variable ratio transmission including a first variable diameter, centrifugally operated pulley in combination with a second variable diameter pulley which is rotatably engaged with the first pulley by a belt, wherein the effective diameter of the second pulley is designed to change inversely with variation in the effective diameter of the first pulley.

It is another object of the subject invention to provide a variable ratio transmission wherein the pulley members of both the first and second variable diameter pulleys are formed of sheet material having substantially uniform thickness wherein each pulley member has a configuration identical to the remaining pulley members so as to permit a very inexpensive manufacturing process.

Other important advantages and objects of the invention will become apparent from consideration of the following description, drawings and appended claims.

Briefly stated, in accordance with the aforesaid objects, the present invention provides a variable diameter, centrifugally operated, speed responsive pulley comprising a central hub; a pair of pulley members mounted for rotational movement with said hub and for axial movement with respect to each other, each said pulley member including an outer frusto-conical surface for engaging a belt and an inner frusto-conical surface spaced radially inwardly within the axial limits of the outer frusto-conical surface; first bias means for biasing the pulley members axially together; and second bias means, such as a pair of rigid inertial mass members, operating against the inner frusto-conical surface for overcoming the first biasing means to axially displace said pulley members apart by a distance which is proportionally related to the rotational speed of the pulley members. The first and second bias means are mounted radially inwardly of the outer frusto-conical surfaces and within the axial space between the inner frusto-conical surfaces. In a preferred embodiment of the invention, a central flange is provided extending radially from the hub to the inside edge of the inner frusto-conical surface and positioned within the space between the planes defined by the outermost radial edges of the pulley members, such that the overall axial width of the pulley need be no greater than a standard pulley which it is designed to replace. In an alternative embodiment of the invention, means are provided to define a central pulley cavity for receiving an inertial mass having fluid properties, which mass functions to centrifugally operate the pulley in lieu of rigid mass members.

The invention also provides a variable ratio transmission including a V-belt, the variable diameter, centrifugally operated, speed responsive pulley of the present invention and a second variable diameter pulley rotatably engaged with the pulley of the invention, in which transmission the effective diameter of the second pulley is designed to vary inversely with variations in the effective diameter of the first pulley.

DETAILED DESCRIPTION OF THE DRAWINGS

Figure 1:
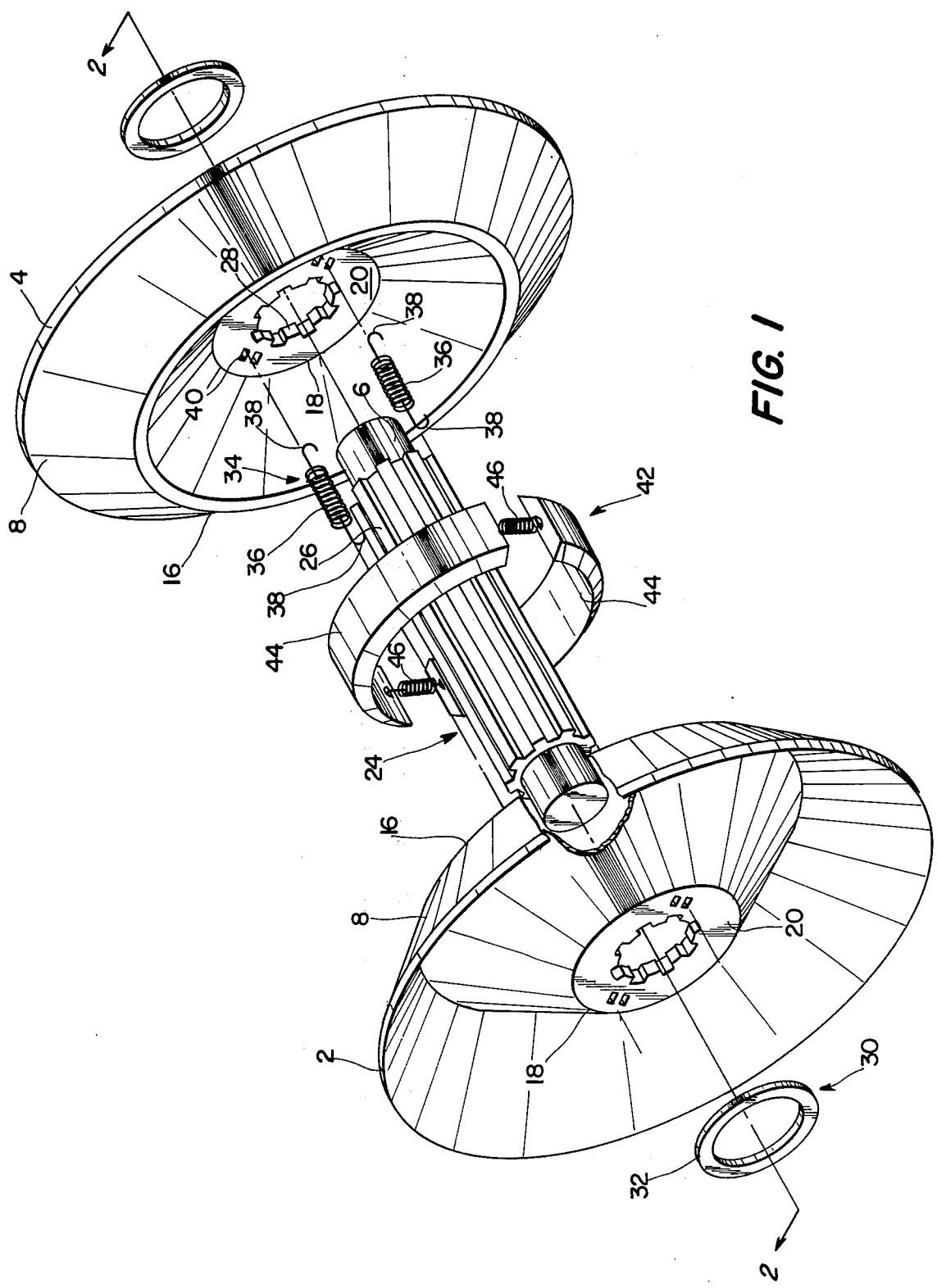
Figure 4:
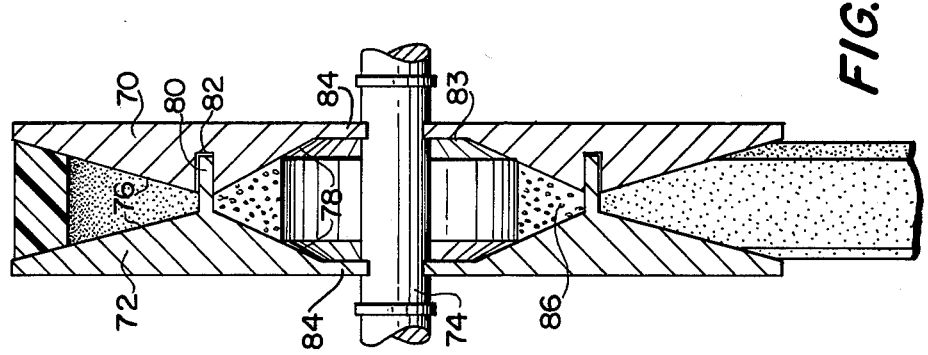
Figure 2:
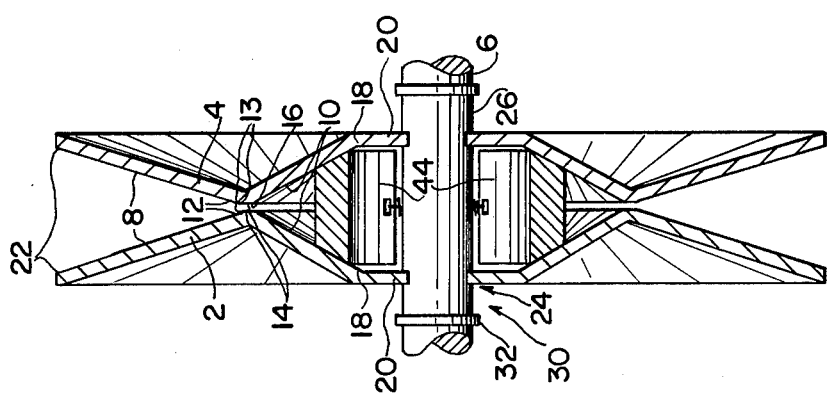

FIG. 1 is an exploded perspective view of a centrifugally operated, variable diameter pulley for use in a variable ratio drive system designed in accordance with the subject invention, FIG. 2 is a cross sectional view taken along lines 2—2 of the variable diameter pulley of FIG. 1 wherein the pulley is illustrated in an assembled condition, FIG. 3a is a cross sectional view of a variable ratio drive employing a centrifugally operated, variable diameter pulley in combination with a tension operated variable diameter pulley designed in accordance with the subject invention, FIG. 3b is a cross sectional view of the variable ratio drive illustrated in FIG. 3a wherein the pulley members of the centrifugally operated variable diameter pulley are illustrated in the position defining a minimum effective pulley diameter, and FIG. 4 is a cross sectional view of an alternative embodiment of the subject invention wherein the rigid inertial weights have been eliminated in favor of an inertial mass material having fluid properties.

DESCRIPTION OF THE PREFERRED EMBODIMENTS

The various components making up a centrifugally operated variable diameter pulley designed in accordance with the subject invention can best be understood by reference to FIG. 1 wherein the various elements making up such a pulley are illustrated in exploded perspective view. In particular, the pulley includes a pair of pulley members 2, 4 adapted to move axially on a central hub 6. As illustrated in FIGS. 1 and 2, each pulley member includes an outer frusto-conical, belt engaging surface 8 and an inner frusto-conical surface 10 spaced radially inwardly within the axial limits of the outer frusto-conical surface, as best illustrated in FIG. 2. The inside edge 13 of the outer frusto-conical surface is joined to the outside edge 14 of the inner frusto-conical surface so as to form an inner circular ridge illustrated at 16 in FIGS. 1 and 2.

Extending between the central hub 6 and the inside edge 18 of the inner frusto-conical surface 10 of each pulley member is a central flange 20. This flange extends radially from the hub and is positioned axially within the space between planes defined by the outermost radial and axial edges 22 of the pulley members. In order to retain the pulley members in a fixed rotation relationship with the central hub 6, spline means 24 are provided for permitting limited axial movement of each pulley member. Such axial movement takes place between a first position in which the outer frusto-conical surfaces 8 form a maximum effective pulley diameter and a second position in which the outer frusto-conical surfaces 8 cooperate to form a minimum effective pulley diameter. As is evident from FIG. 1, the spline means consists of spline teeth 26 on hub 6 for mating with corresponding teeth 28 on the radial flanges 20. Any other type of interconnection which would fix the pulley members rotatively with respect to the central hub and yet permit axial movement of the pulley members between the first and second positions referred to above would, of course, be suitable for use in the subject invention. To provide lubrication, a grease fitting (not illustrated) may be provided in each pulley member near central hub 6.

Pulley member stop means 30, such as shoulder forming rings 32, may be positioned at each axial end of the spline teeth 26 so as to engage the radial flanges 20, respectively, of each pulley member when in the second position. Rings 32 may be affixed to the central hub 6 by any conventional means such as threaded nuts, snap rings or cotter pins. Of course central hub 6 may be rotatably mounted on appropriate journals wherever it is desired to employ a variable diameter pulley. For example, if the subject variable diameter pulley were to be employed in an accessory drive system of an automobile, hub 6 could be rotatably mounted on the engine block or support structure connected therewith.

First bias means 34 including a pair of tension springs 36 are provided for biasing the pulley members axially together. The opposite ends 38 of each tension spring 36 may be received in openings 40 contained in the radial flanges 20 of the pulley members as illustrated in FIG. 1. Second bias means 42, located radially inwardly of the outer frusto-conical surfaces and within the axial space between the inner frusto-conical surfaces 10, is provided for overcoming the force of the first bias means so as to axially displace the pulley members apart by a distance which is proportional to the rotational speed of the pulley members. In FIG. 1, the second bias means 42 is illustrated as a pair of rigid arcuate inertial mass members 44 shaped on the outer radial side to conform to the configuration of the inner frusto-conical surfaces 10. These rigid inertial mass members may be biased together by means of tension springs 46. If desired, stops (not shown) may be provided to establish a mimimal radially retracted position toward which the rigid inertial mass members 44 are drawn by tension springs 46. Upon the FIG. 1 assembly achieving sufficient rotational speed, the inertial members 44 centrifugally move radially outwardly from hub 6 so as to engage the frusto-conical surfaces 10 and to force pulley members 2 and 4 axially apart. The rotational speed at which such movement of the pulley members occurs is dependent upon the tension in springs 36 and 46, the inertial mass of members 44 and the frictional restraints of the spline connection between the pulley members 2, 4 and hub 6. As will be discussed in greater detail hereinbelow, other types of rotational speed responsive means may be provided so as to create the necessary force for overcoming the first bias means, thereby to effect spreading of the respective pulley members and a concomitant reduction of the effective diameter of the pulley.

For a clear understanding of the manner by which the subject invention operates, reference is made to FIG. 3 wherein a speed responsive variable ratio transmission employing the variable diameter pulley of FIGS. 1 and 2 is illustrated during low speed (FIG. 3a) and high speed (FIG. 3b) operation. In particular, a centrifugally operated, variable diameter pulley 50 is illustrated in combination with a second variable diameter pulley 52 rotatably engaged with the first variably diameter pulley 50 by means of a belt 54. Each pulley (50 and 52) includes a pair of tension operated pulley members (2, 4 and 54, 56) respectively mounted for axial movement on central hubs 6 and 58, respectively. Like the variable diameter pulley of FIGS. 1 and 2, the pulley members 54 and 56 each include an outer frusto-conical surface 60 for frictionally engaging the belt 54. Tension means 62 are provided for biasing the tension operated pulley members 54 and 56 together and for permitting the pulley members to move relative to one another so as to vary the effective diameter of the second pulley 52 in inverse proportion to variation in the effective diameter of the first variable diameter pulley 50. The tension means 62 can be identical to the tension spring 36 illustrated in FIG. 1. It should also be noted that the pulley members 2, 4, 54 and 56 may be identical in shape as illustrated in the drawings. Each pulley member is, thus, provided with a central flange 66 extending between the inner edge of the corresponding inner frusto-conical surface and the associated central hub. This identical configuration provides a very important advantage of the subject invention, whereby both pulleys may be formed from the same identical pulley members with pulley 52 being formed simply by omitting the second bias means 42.

Operation of the variable ratio transmission which incorporates the centrifugally operated, variable diameter pulley of the subject invention can now be easily understood. At low speed, the force applied by the rigid inertial weights 44 of the second bias means 42 is insufficient to cause pulley members 2 and 4 to be biased apart since the tension of springs 36 are chosen to exceed the tension applied by springs 64. Thus, at low speed the variable ratio transmission would operate in a configuration illustrated in FIG. 3a wherein the centrifugally operated pulley 50 would have a maximum effective diameter (i.e., maximum distance for pulley 50 between hub 6 and the area of frictional contact with belt 54) and the tension operated pulley 52 would have a minimum effective diameter (i.e., minimum distance for pulley 52 between hub 58 and the area of frictional contact with belt 54). As the rotational speeds of the pulleys increase, the centrifugal force produced by inertial masses 44 and applied against the inner frusto-conical surfaces 10 would proportionally increase to cause pulley members 2 and 4 to spread apart until they reach the position illustrated in FIG. 3b wherein pulley 50 is illustrated as having a minimum effective diameter while the tension operated pulley 52 has assumed its maximum effective diameter.

It must be emphasized that an important feature of the subject invention is the simplified configuration of the respective pulley members which allows these members to be formed from sheet material of substantially uniform thickness such as by stamping or other mechanical processes. Moreover, by forming the tension operated pulley and the centrifugally operated pulley out of identical pulley members it is possible to affect significant manufacturing savings when such pulleys are used to form a variable ratio transmission responsive to speed. The unique design of the individual pulley members also permits the variable ratio transmission to be mounted in a small axial space which need be no larger than the outermost axially spaced positions of the pulley members. Thus, there is no additional axial space required for a centrifugal pulley operator as is required when using prior art devices.

FIG. 4 illustrates an alternative embodiment of the centrifugally operated variable diameter pulley wherein the pulley is formed by a pair of pulley members 70 and 72 associated with a central hub 74 in a manner similar to that illustrated in FIGS. 1 and 2. Each pulley member is provided with an outer frusto-conical surface 76 and an inner frusto-conical surface 78 which cooperates with the corresponding surface on the other pulley member to provide belt engaging surfaces and centrifugal force receiving surfaces, respectively. The variable diameter pulley of FIG. 4 differs from that illustrated in FIGS. 1 and 2 by the provision of a cylindrical extension 80 having a central axis coincident with the central axis of the hub 74. One end of the cylindrical extension 80 is integrally connected to the outside edge of the inner frusto-conical surface 78 of pulley member 72 while the other pulley member 70 is provided with a cylindrical cavity 82 shaped and oriented to telescopically receive in sealing relationship the cylindrical extension 80 as the pulleys move axially on hub 74. As is thus evident from FIG. 4, a central pulley cavity 83 is defined by the cylindrical extension 80, the inner frusto-conical surfaces 78 and radial flanges 84 corresponding to flanges 20 illustrated in FIGS. 1 and 2. Disposed within this pulley cavity is an inertial mass 86 having fluid properties such that as the FIG. 4 assembly achieves rotational speed the mass will substantially conform to the varying outer radial members 70 and 72 as they move axially relative to one another on the hub. Such inertial mass 86 may be formed, e.g., from small diameter, high density solid particles which take on the flow characteristics of a liquid and distribute themselves evenly around the circumference by virtue of the centrifugal forces generated upon rotation of the pulley. Alternatively, the inertial mass may be other type solid particulate or other matter, liquid, liquid metal, or any other type mass which can satisfy the flow needs of a centrifugally actuated inertial system and, of course, be practical for usage. Obviously, an important consideration in selecting the inertial mass material 86 will be its density such that a sufficient centrifugal force will develop over the operating speed of the pulley. The viscosity of the fluid material is also important so as to insure rotation of the material with the pulley. Where small particles are used to make up the mass 86, their viscosity may be modified by immersing the particles in a liquid vehicle. Moreover, it may be possible to provide grooves or other friction creating modifications on the inner frusto-conical surface 78 so as to further modify the interaction between the inertial mass 86 and the respective pulley members. One exemplary type of solid particle which may be used in forming the inertial mass is lead shot, but other types of high density material in small particulate form may also be used.

It should now be evident that a variable diameter pulley of uniquely simplistic, yet effective, design has been disclosed which design may be incorporated in a particularly simple speed responsive, variable ratio transmission. Of particular importance is the possibility of forming both a centrifugally operated variable diameter pulley and a tension operated variable diameter pulley out of identical pulley members by means of a low cost stamping operation to provide an economical variable ratio transmission having minimal axial space requirements when placed in operation. Moreover, the subject design is particularly well suited as a control speed accessory drive for providing improved fuel efficiency of automobiles. The extremely simple design is of particular importance in this environment since the centrifugal operator may be entirely enclosed within a sealed central pulley cavity thus eliminating the possibility of contamination carried by the ambient environment. Other advantages and improvements over the prior art are, of course, evident from the above description of the preferred embodiment.

While the present invention has been described with reference to particular embodiments thereof, it will be understood that numerous modifications may be made by those skilled in the art without actually departing from the scope of the invention. Accordingly, all modifications and equivalents may be resorted to which fall within the scope of the invention as claimed.

What is claimed as new is:

1. A speed responsive, variable ratio transmission, comprising
   A. a V-belt;
   B. a first variable diameter pulley for engagement with said V-belt, said first variable diameter pulley including:
      (1) a first rotatably supported hub,
      (2) first and second identically shaped pulley members, each said first and second pulley member including an outer frusto-conical surface, an inner frusto-conical surface spaced radially inwardly within the axial limits of said outer frusto-conical surface, a radial flange extending from the inner radial extremity of said inner frusto-conical surface toward said first central hub, and first connection means for connecting the inner radial extremity of said radial flange to said first central hub to prevent relative rotational movement therebetween and to permit axial movement on said first central hub to vary the effective diameter of said first variable diameter pulley by causing opposite sides of said V-belt to engage, respectively, said outer frusto-conical surfaces at a radial distance from the rotational axis of said first central hub dependent upon the axial spacing between said outer frusto-conical surfaces,
      (3) first bias means connected with said radial flanges of said first and second pulley members for biasing said pulley members together into engagement with opposite sides of said V-belt, and
      (4) second bias means for overcoming said first bias means to displace said pulley members apart axially by a distance which is proportional to the rotational speed of said members, said second bias means includes an inertial mass mounted radially inwardly of said outer frusto-conical surfaces within the axial space between said inner frusto-conical surfaces and in contact with said inner frusto-conical surfaces; and
   C. a second variable diameter pulley rotatably linked with said first variable diameter pulley by said V-belt, said second variable diameter pulley including:
      (1) a second rotatably supported central hub,
      (2) a pair of identically shaped tension operated pulley members, each said tension operated pulley member including an outer frusto-conical surface, an inner frusto-conical surface spaced radially inwardly within the axial limits of said outer frusto-conical surface, a radial flange extending from the inner radial extremity of said inner frusto-conical surface toward said second central hub, and second connection means for connecting the inner radial extremity of said flange to said second central hub to prevent relative rotational movement therebetween and to permit axial movement on said second central hub to vary the effective diameter of said second variable diameter pulley by causing opposite sides of said V-belt to engage, respectively, said outer frusto-conical surfaces at a radial distance from the rotational axis of said second central hub dependent upon the axial spacing between said outer frusto-conical surfaces, each said tension operated pulley member being identical in shape with each of said first and second pulley members, and
      (3) tensioning means connected with the radial flanges of said tension operated pulley members for biasing said tension operated pulley members together to cause the outer frusto-conical surfaces of said pair of tension operated pulley members to frictionally engage, respectively, the opposite sides of said V-belt and for allowing said tension operated pulley members to move axially relative to one another to vary the effective diameter of said second pulley in inverse proportion to variation in the effective diameter of said first pulley.

2. A variable ratio transmission as defined in claim 1, wherein said radial flanges of each said pulley member are positioned in the axial space between the planes defined by the radial extremities of said outer frusto-conical surfaces of each pair of pulley members forming said first and second pulleys, respectively.

3. A variable ratio transmission as defined in claim 2, wherein the outer edge of each said inner frusto-conical surface of each said pulley member is connected to the inner edge of each corresponding outer frusto-conical surface.

4. A variable ratio transmission as defined in claim 3, wherein each said pulley member is formed of sheet material having substantially uniform thickness.

5. A variable ratio transmission as defined in claim 1, wherein said first bias means includes at least one tension spring connected at opposite ends to said radial flanges respectively so as to axially bias said pulley members together.

6. A variable ratio transmission as defined in claim 1, wherein said second bias means includes at least a pair of rigid inertial mass members shaped to conform in part to the configuration of said inner frusto-conical surfaces.

7. A variable ratio transmission as defined in claim 1, further including pulley member stop means connected with said hub for defining outer limits for the axial movement of each said pulley member to prevent said pulley members from moving apart by a distance equal to or greater than the effective width of said V-belt with which said outer frusto-conical surfaces are engaged, said stop means including a pair of shoulders connected with said hub and positioned to engage said radial flanges, respectively, of said pulley members.

8. A variable ratio transmission as defined in claim 1, wherein said first and second connecting means includes spline means for retaining said pulley members in fixed rotational relationship with said corresponding central hubs and for permitting limited axial movement of each said pulley member between a first position in which said outer frusto-conical surfaces co-operate to form a maximum effective pulley diameter and a second position in which said outer frusto-conical surfaces co-operate to form a minimum effective pulley diameter.

* * * * *